United States Patent [19]

Safranek

[11] Patent Number: 4,874,977

[45] Date of Patent: Oct. 17, 1989

[54] STATOR ASSEMBLY HAVING COIL BOBBINS WITH RETAINING CLIPS

[75] Inventor: Edward J. Safranek, Arlington Heights, Ill.

[73] Assignee: F & B Mfg. Co., Gurnee, Ill.

[21] Appl. No.: 191,878

[22] Filed: May 9, 1988

[51] Int. Cl.[4] .................. H02K 1/18; H02K 15/02
[52] U.S. Cl. ........................ 310/269; 248/27.3; 248/231.8; 310/42; 310/91; 336/196
[58] Field of Search .............. 248/27.3, 231.8, 316.7; 310/42, 71, 74, 91, 153, 194, 208, 217, 269, 214, 216; 336/196, 197; 29/598

[56] References Cited

U.S. PATENT DOCUMENTS

| | | | |
|---|---|---|---|
| 3,619,679 | 11/1971 | Carmichael | 310/74 |
| 3,885,302 | 5/1975 | Boesel | 310/217 |
| 4,019,485 | 4/1977 | Carlsson | 310/153 |
| 4,633,114 | 12/1986 | Reynolds | 310/194 |

FOREIGN PATENT DOCUMENTS 72798  11/1947  Norway ..................... 336/197

Primary Examiner—Peter S. Wong
Assistant Examiner—D. L. Rebsch
Attorney, Agent, or Firm—Hill, Van Santen Steadman & Simpson

[57] ABSTRACT

A stator assembly is associated with a rotor to form an alternator. The stator assembly has pole legs with pole faces, past which magnets on the rotor rotate. At least one coil bobbin with a coil thereon is slidably received over at least one of the pole legs, said at least one pole leg having a notch in a side thereof. A bobbin locking clip is positioned in a gap between a central aperture wall of the bobbin and the one side of the pole leg having the notch. The clip of springy material has two springy tabs for engagement in the notch and an embossment on a main body surface thereof, so as to provide three-point contact. The bobbin and coil to be wound thereon can be manufactured separate from the stator assembly, and then the bobbin with the coil can be slid on the pole legs after assembly. The stator is also assembled such that rivets are provided at a central portion, and rivets are provided near end faces of pole legs on which bobbins are not provided.

7 Claims, 1 Drawing Sheet

STATOR ASSEMBLY HAVING COIL BOBBINS WITH RETAINING CLIPS

RELATED APPLICATIONS

Copending applications of the same inventor also relating to alternators are: "Hall Effect Device Ignition and Charging System", Hill Case P-87,2483; "High Efficiency Charging and Regulating System", Hill Case P-88,0516; and "High Efficiency Electrical Alternator System", Hill Case P-88,0517.

BACKGROUND OF THE INVENTION

1. Field of the Invention

The present invention relates to electrical alternator systems and particularly the stator employed in conjunction with a flywheel/rotor in a gasoline engine. More particularly, the present invention relates to a marine engine alternator construction, and particularly the stator assembly therefor.

2. Description of the Prior Art

It is known in engines, and particularly small engines and marine engines, to employ the flywheel thereon as a rotor portion of an alternator, and to locate a stator within the flywheel/rotor.

In such prior art systems, the stator has been expensive and difficult to construct since the pole legs of the stator have coil bobbins permanently mounted thereon and wherein a pole end face of the pole legs is substantially widened, thus preventing placement and removal of coil bobbins thereon. In such prior art systems, the coils are wound on the bobbins with the bobbins in place on the stator legs. Furthermore, the laminations stacked to form the stator are typically impregnated or laminated as a group to maintain overall stator integrity. Such techniques are costly and require excessive manufacturing time.

SUMMARY OF THE INVENTION

It is an object of the present invention to provide a stator assembly which is of simpler construction and more easily manufactured than prior art stators, particularly in engine alternators where the rotor portion of the alternator is also the flywheel of the engine.

It is another object of the invention to simplify manufacture of the stator, and particularly the winding of coils on the stator.

It is another object of the invention to improve overall stator integrity without costly laminating and/or impregnating techniques.

It is another object of the invention to provide a stator and particularly for a marine or other small engine application, whereby the stator can be easily repaired in the field without requiring installation of an entirely new stator assembly.

According to the invention, pole legs for the stator are designed in rectangular fashion such that a coil bobbin can be easily slipped over the pole legs into position. The coil bobbins are retained in position by a bobbin lock clip which cooperates with a notch cut out on at least one side of the pole leg. The bobbin lock clip is designed such that it will firmly hold the coil bobbin in place on the stator, but yet permits removal of the coil from the pole leg when desired. With the invention, individual coils for the stator can be wound on bobbins separate from the overall stator assembly. They can furthermore be vacuum impregnated prior to placement on the pole legs. Also in accordance with the invention, on unused pole legs of the stator, rivets are provided, whereas in pole legs of the stator having coils thereon, no rivets are provided. Pole legs having coils are prevented by the bobbins from vibrating due to high frequency magnetic current changes, and the unused pole legs do not vibrate as a result of the use of the rivets. It is therefore not necessary to impregnate or encapsulate the laminations together as a group.

With the invention, the individual coils can be manufactured apart from the stator laminations, can be vacuum impregnated, and then placed on the pole legs. Furthermore, for field servicing, the individual coils can be simply removed and replaced, without replacement of the overall stator assembly.

DESCRIPTION OF THE PREFERRED EMBODIMENTS

Figure 1:
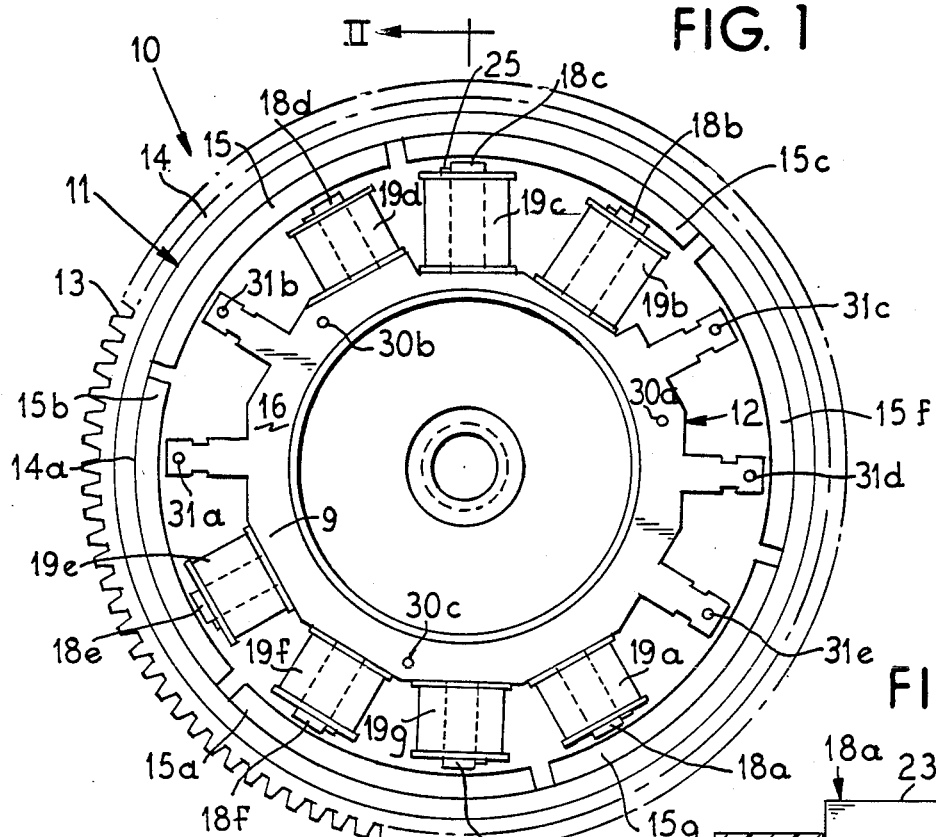
FIG. 1 is a plan view of an alternator formed of a stator according to the invention together with an associated fly wheel/rotor.

FIG. 1 shows an alternator 10 formed of a rotor 11 and a stator assembly 12. The rotor 1 is also the fly wheel of an engine such as a marine outboard engine. Such a rotor/flywheel 11 is typically connected to a drive shaft 8 of the engine. A ring gear 13 for engagement by a starter motor (not shown) is provided around a periphery of the rotor. The rotor has a peripheral wall 14 having mounted at its inner surface 14a a plurality of magnets 15a, b, c, d, e, f.

Figure 2:
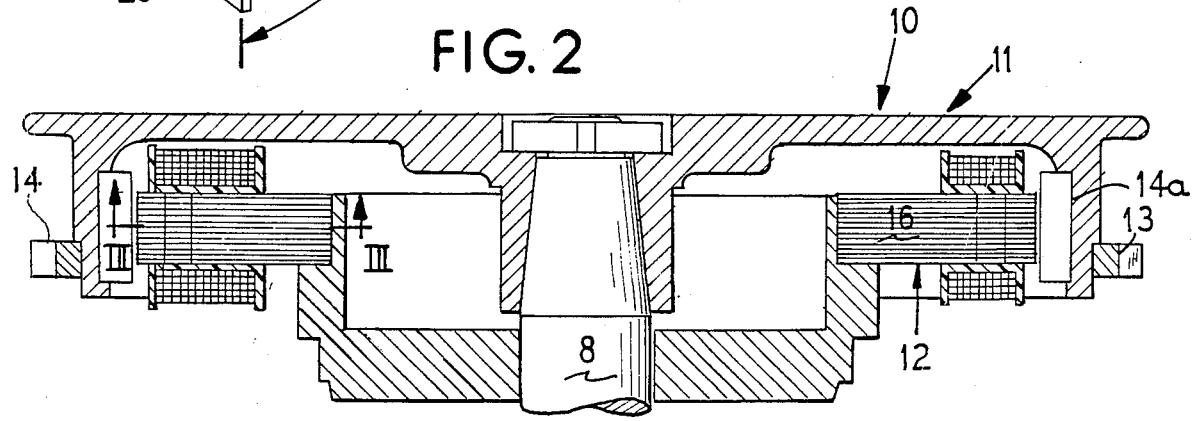
FIG. 2 is a cross-sectional view taken along line II—II of FIG. 1.

The stator 12 is formed of a plurality of laminations 16 which are stacked as more clearly shown in FIG. 2. The stator has individual pole legs 17a, b, c, d, e which are unused, and pole legs 18a–g on which respective coils 19a–g are mounted.

As the rotor rotates, the magnets are moved past the end faces of the pole legs.

Figure 3:
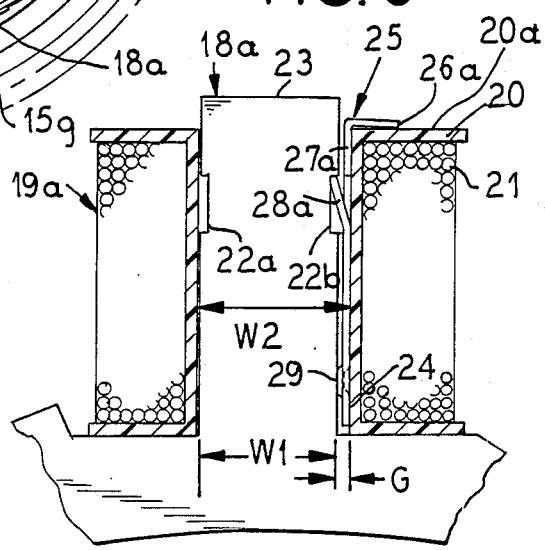
FIG. 3 is a cross-sectional view taken along line III—III of FIG. 2 showing a bobbin retaining system according to the invention.

As shown most clearly in FIG. 3, the coil 19a is mounted on the pole leg 18a. The coil 19a includes coil windings 21 wound on a plastic bobbin 20.

The pole leg 18a has first and second notches 22a, b in side walls thereof near the pole end face 23 of the pole leg 18a. The width W1 of the pole leg is less than a width W2 of an aperture 24 of the bobbin 20. Thus, a gap G is provided within which a bobbin locking clip 25 shown in perspective view in FIG. 4 is inserted.

Figure 4:
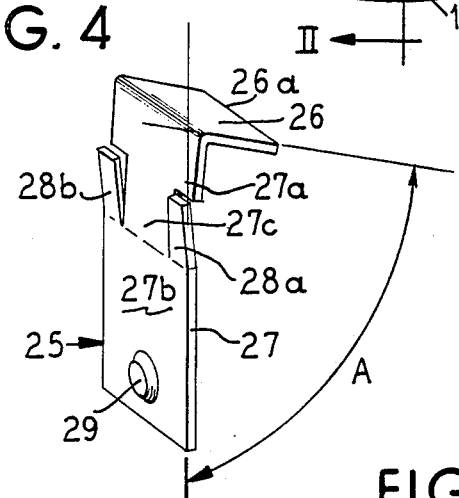
FIG. 4 is a perspective view of a bobbin lock clip employed in the bobbin retaining system of FIG. 3.

Referring to FIG. 4, the bobbin lock clip 25 is made of a springy metal and has a springy lip 26, and a main body 27 formed of a first portion 27a having kicked out tabs 28a and 28b, and a section 27b which is angled slightly as at a bending zone 27c relative to 27a. Additionally, a raised circular embossment 29 extends upwardly from the surface 27b in the same direction that the tabs 28a and 28b extend upwardly.

When the bobbin lock clip 25 is inserted in the gap G, the slight bend at region 27c together with the action of the kick-out tabs 28a, 28b, causes the kick-out tabs 28a, b to engage in the pole face end of the notch 22b. Since the spring loaded lip is formed at an angle A which is less than 90° relative to the portion 27b, the leading end 26a abuts against the surface 20a of the bobbin 20 so as to exert a force which drives the leading end of the tab 28a into the upper corner of the notch 22b. The lock clip is thus securely retained in place and in turn retains the bobbin securely in position on the pole leg.

By providing two kick-out tabs 28a, b and the embossment 29 in a triangular pattern, a stable three-point contact results such that the coil bobbin is firmly secured on the pole leg.

As shown in FIG. 1, the laminations are held together by centrally located rivets 30a, b, c in a main body portion 9 of the laminations. Furthermore, additional rivets 31a–e on the pole legs not having coils mounted thereon secure the ends of these pole legs to prevent vibration. The pole legs having coils thereon are not riveted, but rather are secured with the bobbins mounted thereon. With the present system, it is not necessary to encapsulate all of the laminations together as a unit.

With the present invention, construction of the stator can occur in the following simple manner. First, a coil can be wound on a bobbin. Also, at least one notch is provided in the side of at least those pole legs to receive coil bobbins. The coils are then wound on the bobbins apart from the stator assembly. A layer of high temperature glass tape is provided on the windings, lead wire terminations are connected to the coil, another layer of glass tape is provided, and then the overall assembly is vacuum impregnated with an epoxy or polyester or through use of bondable wire. Thereafter, the completed coil bobbin assemblies are slipped onto the desired pole legs and the bobbin lock clips are inserted to lock the bobbins in position on the pole legs.

Of course, prior to placement of the coil bobbins on the stator, the stator laminations are assembled together and riveted as described previously.

A width of the bobbin across the notched sides of the stator pole is preferably larger by two material thicknesses of the locking clip.

The hold-down clip has a flange which is bent less than 90° to provide a spring force of the ends of the kick-outs on the clip into the groove as described previously.

Although various minor changes and modifications might be proposed by those skilled in the art, it will be understood that I wish to include within the claims of the patent warranted hereon all such changes and modifications as reasonably come within my contribution to the art.

I claim as my invention:

1. A stator, comprising:
a plurality of stacked laminations forming a stator assembly having a plurality of pole legs;
at least one of the pole legs having a bobbin with an associated coil wound and impregnated thereon slidably received on the pole leg;
locking clip means inserted in a gap between a side of the pole leg and a side of an aperture of the bobbin for retaining the bobbin on the pole leg, an opposite side of the pole leg being flush with an opposite side of the aperture;
said pole legs being rectangular in cross section, having a cross-sectional area at an end face which is the same as a cross-sectional area interiorly of the end face, and having at least one notch provided in a side thereof;
said locking clip means comprising a springable metal clip having at one end a bent lip which forms an angle of less than 90° relative to a main body portion of the clip, and wherein said main body portion has two springy kick-out tabs which engage in said notch; and
the main body portion also having an embossment extending above the main body portion in a direction which is the same as a direction in which said kick-out tabs extend above the main body portion.

2. A stator, comprising:
a plurality of stacked laminations forming a stator assembly having a plurality of pole legs;
at least one of the pole legs having a bobbin with an associated coil wound and impregnated thereon slidably received on the pole leg;
locking clip means inserted in a gap between a side of the pole leg and a side of an aperture of the bobbin for retaining the bobbin on the pole leg, an opposite side of the pole leg being flush with an opposite side of the aperture; and
the laminations being fastened together with rivets at a central portion, rivets being provided at ends of pole legs which do not have coils thereon, and ends of pole legs having coils thereon not having rivets.

3. A stator, comprising:
a plurality of stacked laminations forming a stator assembly having a plurality of pole legs which are rectangular in cross-section;
at least one of the pole legs having a bobbin with an associated coil wound on the bobbin, the bobbin being slidably received on the pole leg;
locking clip means inserted in a gap between a side of the pole leg and a side of an aperture of the bobbin for retaining the bobbin on the pole leg, an opposite side of the pole leg directly abutting with an opposite side of the bobbin aperture; and
the locking clip means comprising a substantially L-shaped springable locking clip formed by a main body portion and a bent lip, said main body portion having at an end near the bent lip two springy kick-out tabs engageable in said notch, and a dimple-like embossment extending above the main body portion in a direction which is the same as a direction in which said kick-out tabs extend above the main body portion, a top of said dimple-like embossment being in sliding contact with said opposite side of the pole leg.

4. A stator according to claim 3 wherein a thickness of said gap between the side of the pole leg and the side of the aperture of the bobbin is substantially two thicknesses of said main body portion.

5. A stator according to claim 3 wherein ends of pole legs not having bobbins thereon having rivet means for secure connection of the laminations, and pole legs having bobbins thereon not having rivets therein.

6. A stator according to claim 3 wherein said kick-out tabs lie directly at opposite side edges of the main body portion of the clip.

7. A stator according to claim 3 wherein said main body portion is bent at a base of said tabs where said tabs are integral with the main body portion.

* * * * *